(12) United States Patent
Hwu et al.

(10) Patent No.: US 8,912,707 B2
(45) Date of Patent: Dec. 16, 2014

(54) FRICTION-DRIVEN ACTUATOR

(75) Inventors: En-Te Hwu, Taipei (TW); Hsien-Shun Liao, Taipei (TW); Ing-Shouh Hwang, Taipei (TW)

(73) Assignee: Academia Sinica, Taipei (TW)

( * ) Notice: Subject to any disclaimer, the term of this patent is extended or adjusted under 35 U.S.C. 154(b) by 265 days.

(21) Appl. No.: 13/182,023

(22) Filed: Jul. 13, 2011

(65) Prior Publication Data

US 2013/0015745 A1   Jan. 17, 2013

(51) Int. Cl.
*H02N 2/00* (2006.01)
*H01L 41/09* (2006.01)
*H02N 2/02* (2006.01)
*H02N 2/10* (2006.01)
*G01Q 10/04* (2010.01)

(52) U.S. Cl.
CPC ............. *G01Q 10/04* (2013.01); *H02N 2/025* (2013.01); *H02N 2/101* (2013.01); *H02N 2/028* (2013.01)
USPC ...................................................... 310/328

(58) Field of Classification Search
USPC ............. 310/323.01, 323.92, 323.08, 323.09, 310/323.16, 323.17, 328
See application file for complete search history.

(56) References Cited

U.S. PATENT DOCUMENTS

| | | | | |
|---|---|---|---|---|
| 5,039,899 | A * | 8/1991 | Yamaguchi | 310/323.16 |
| 5,466,985 | A * | 11/1995 | Suzuki | 310/333 |
| 6,211,607 | B1 * | 4/2001 | Kanbara | 310/328 |
| 6,476,537 | B1 * | 11/2002 | Pease et al. | 310/317 |
| 6,765,335 | B2 * | 7/2004 | Wischnewskiy | 310/323.02 |
| 7,196,454 | B2 | 3/2007 | Baur et al. | |
| 7,504,921 | B2 * | 3/2009 | Vranish | 335/302 |
| 7,633,207 | B2 * | 12/2009 | Sakamoto | 310/323.09 |
| 7,652,409 | B2 * | 1/2010 | Dixon et al. | 310/328 |
| 2002/0084719 | A1 * | 7/2002 | Okamoto et al. | 310/328 |
| 2005/0184623 | A1 * | 8/2005 | Baur et al. | 310/328 |
| 2006/0232168 | A1 * | 10/2006 | Konishi et al. | 310/328 |
| 2007/0040479 | A1 * | 2/2007 | Namikawa et al. | 310/328 |
| 2007/0228884 | A1 * | 10/2007 | Manabe | 310/328 |

FOREIGN PATENT DOCUMENTS

| | | | | |
|---|---|---|---|---|
| JP | 2011-133792 A | * | 7/2011 | G02B 7/04 |
| WO | WO 99/54988 | * | 10/1999 | H02K 11/00 |

* cited by examiner

*Primary Examiner* — Thomas Dougherty
(74) *Attorney, Agent, or Firm* — Occhiuti & Rohlicek LLP

(57) ABSTRACT

An apparatus for actuating a positioning device includes a housing; a piezoelectric element connected to the housing; a driven element configured to move relative to the housing; and a flexible element connected to the piezoelectric element and configured to transfer a motion of the piezoelectric element to the driven element.

33 Claims, 17 Drawing Sheets

FRICTION-DRIVEN ACTUATOR

FIELD OF DISCLOSURE

This disclosure relates to positioning apparatuses, and in particular, to actuators for positioning apparatuses.

BACKGROUND

Positioning apparatuses are utilized in a variety of applications, such as scanning probe microscopy, micro-scale and nano-scale characterization and testing, and micro-scale and nano-scale fabrication or assembly. In general, a sample resting on a stage is moved approximately into position by a coarse positioning apparatus and then adjusted into a precise position by a precision positioning apparatus having finer resolution. In many cases, positioning apparatuses employ piezoelectric actuators.

Referring to FIG. 1, one example of a positioning apparatus is a friction-driven actuator 100 used for positioning a sample 199 that rests on a driven element 190. A piezoelectric (PZT) element 150 is attached to a base 110. A friction element 170 coupled to the PZT element 150 frictionally engages a bottom surface of the driven element 190. The PZT element 150 elongates or contracts in the X direction in response to an applied electrical signal, causing the friction element 170 to move along the X axis. This linear motion is transferred to the driven element 190 via the frictional engagement between the friction element 170 and the driven element 190, thus causing the driven element 190 to slide relative to the base 110 and effecting X motion of the sample 199 in the X direction.

SUMMARY

In one aspect, the invention features an apparatus for actuating a positioning device. Such an apparatus includes a housing; a piezoelectric element connected to the housing; a driven element configured to move relative to the housing; and a flexible element connected to the piezoelectric element. The flexible element is configured to transfer a motion of the piezoelectric element to the driven element.

In some embodiments, the flexible element is configured to frictionally engage the driven element.

Other embodiments also include a preload element configured to impose a force normal to an interface between the flexible element and the driven element. Among these are those embodiments in which the pre-load element has a spring, and those in which it has a magnet. However, any other that applies a pre-loading force can be used.

Yet other embodiments include a friction element disposed between the flexible element and the driven element, the friction element being configured to frictionally engage the driven element. In some of these embodiments, the friction element includes a magnet. However, this is not always the case, as the friction element can be something other than a magnet.

Also included among the many alternate embodiments of the apparatus are those that further include a preload element configured to impose a force normal to an interface between the friction element and the driven element.

Other embodiments include structures for guiding motion of the drive element relative to the housing. Among these embodiments are those that include a slide guide configured to guide the motion of the driven element relative to the housing. In some of these embodiments, the slide guide is further configured to limit the extent of motion of the driven element.

In other embodiments, the driven element is separated from the piezoelectric element.

The apparatus also includes many embodiments that cause the driven element to move in a variety of directions relative to the housing. For instance, there are embodiments of the apparatus in which the driven element is configured to move linearly relative to the housing, and there are also embodiments of the apparatus in which the driven element is configured to rotate relative to the housing.

Also included are embodiments that vary the way in which the driven element is moved relative to the housing. Among these are those in which the driven element is configured to move relative to the housing via stick-slip motion.

In other embodiments, the apparatus also includes a position-sensing element coupled to the driven element; and a detection element configured to detect the position of the position-sensing element A variety of signals can be used to control the motion caused by the apparatus. For example, embodiments of the apparatus include in which the piezoelectric element is controllable by a triangular wave signal, those in which the piezoelectric element is controllable by a saw-tooth electrical signal, those in which the piezoelectric element is controllable by a pulse-width modulated electrical signal, and those in which the piezoelectric element is controllable by any one of the foregoing, whether singly or in combination.

Many different kinds of piezoelectric elements can be used in the apparatus. For instance, in some embodiments, the piezoelectric element has a piezoelectric stack. In others, it has a shear mode piezoelectric element.

The driven element, in some embodiments of the apparatus, is configured to receive a specimen. For example, the driven element might be a stage of a microscope or coupled to a stage of a microscope to cause movement thereof.

In another aspect, the invention features an apparatus for actuating a positioning device. Such an apparatus includes a housing; a piezoelectric element; a flexible element connected to the piezoelectric element; and a driven element configured to move relative to the housing in response to a motion of the piezoelectric element.

Among the embodiments of the foregoing apparatus are those in which a friction element is disposed between the piezoelectric element and the driven element. Such a friction element is configured to transfer a motion of the piezoelectric element to the driven element. In some embodiments, the friction element includes a magnet.

Yet other embodiments include those having a preload element configured to impose a force normal to an interface between the friction element and the driven element.

Other embodiments include those in which the flexible element is also connected to the housing and those in which the piezoelectric element is connected to the driven element.

The friction-driven actuator described herein has a number of advantages. Piezoelectric elements are made of fragile ceramics that are generally sensitive to external impacts or shear stresses. Because the driven element does not directly contact the piezoelectric element, the piezoelectric element can be protected from damage that could otherwise result from, for instance, a sudden impact on the driven element or strain deformation of the driven element due to a heavy sample. The lifetime of the piezoelectric element can thus be extended.

The friction-driven actuator described herein can be utilized for centimeter-scale, millimeter-scale, nanometer-scale, and sub-nanometer-scale positioning, and thus is suitable for both long-range positioning and high-precision scanning in various scanning probe microscopy applications, such as atomic force microscopy (AFM).

Other features and advantages of the invention are apparent from the following description and from the claims.

DETAILED DESCRIPTION

Friction-Driven Actuator

Figure 1:
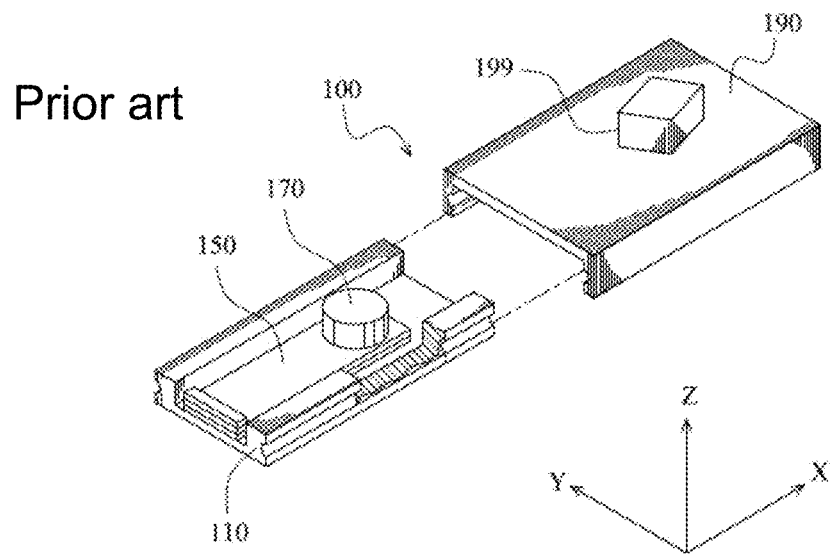
FIG. 1 is a perspective diagram of a prior art positioning apparatus.
Figure 2:
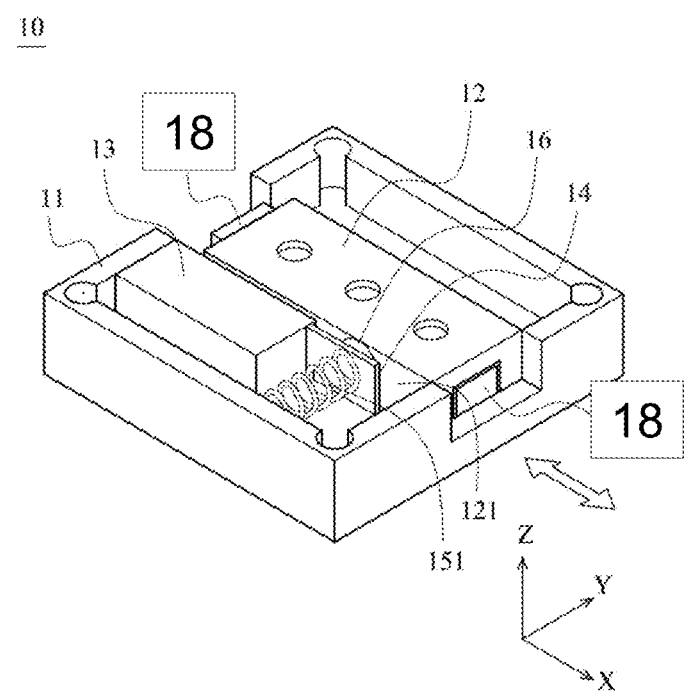
FIG. 2 is a perspective diagram of a friction-driven actuator.
Figure 3:
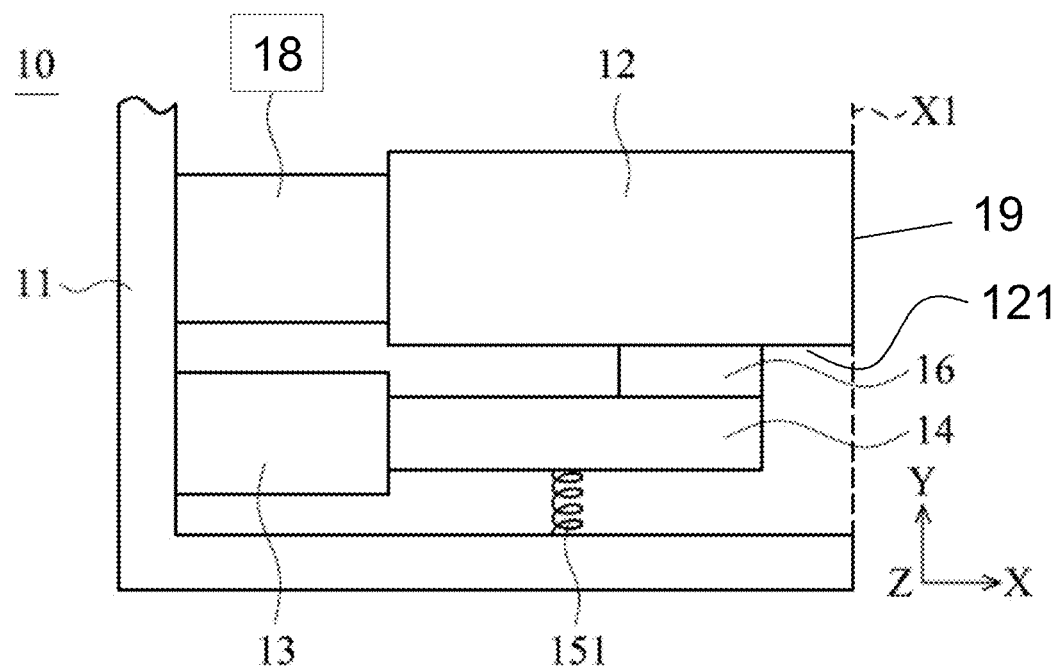
FIG. 3 is a block diagram of the friction-driven actuator of FIG. 2.

Referring to FIGS. 2 and 3, a friction-driven actuator 10 includes a piezoelectric (PZT) element 13, such as a PZT stack, connected at one end to a housing 11. A second end of PZT element 13 is connected to a flexible element 14, which frictionally engages a surface 121 of a driven element 12. In some cases, the flexible element 14 directly contacts a surface 121 of the driven element 12. In other cases, the flexible element 14 is coupled via a friction element 16 to the driven element 12. The friction element 16 is anchored to the flexible element 14 and is frictionally coupled to the driven element 12. The driven element 12 holds a specimen (not shown), such as a specimen for investigation in a scanning probe microscope, or a stage on which a specimen is placed.

Application of an electrical signal to the PZT element 13 induces an elongation or contraction of the PZT element in the X direction. As the PZT element 13 elongates and contracts, the flexible element 14 and the friction element 16 are moved in the X direction. Due to the frictional contact between the friction element 16 and the driven element 12, the driven element 12 is also moved in the X direction relative to the housing 11. The direction and extent of motion of the driven element 12 are restricted by a slide guide 18.

Figure 4A:
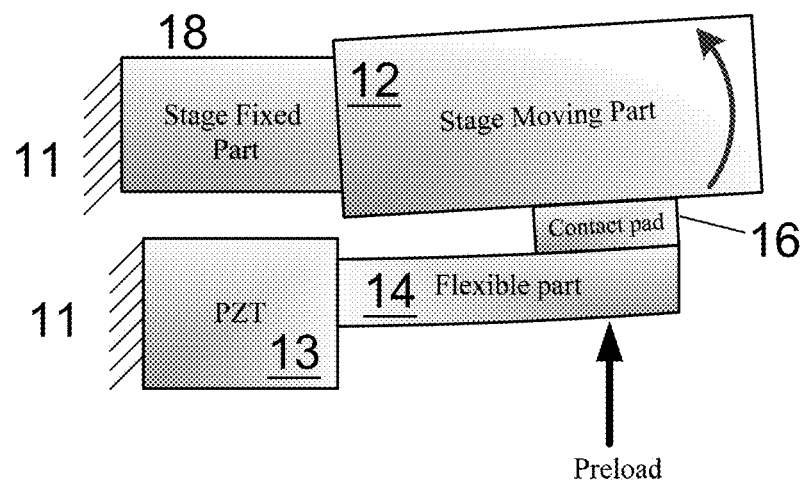
FIGS. 4A and 4B are block diagrams of the friction-driven actuator of FIG. 2 with external forces applied.
Figure 4B:
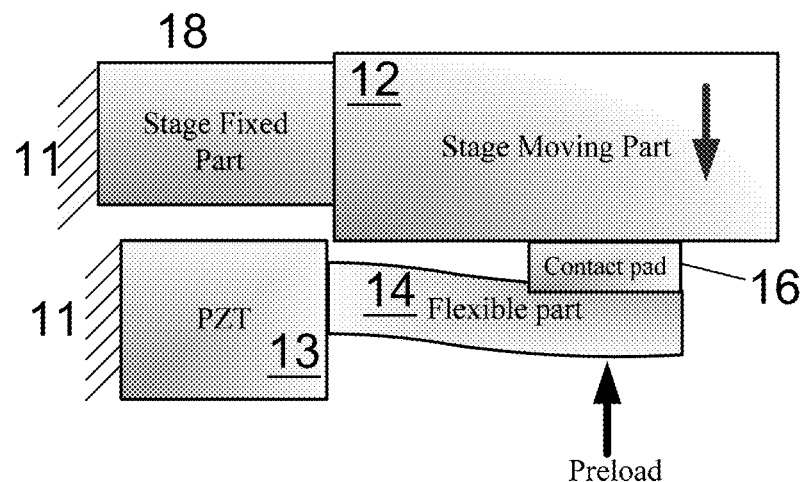

The driven element 12 does not directly contact the PZT element 13. Thus, any load, stress, or strain applied to the driven element 12 (e.g., by the weight of a specimen resting on driven element 12) or to another part of friction-driven actuator 10 is absorbed by the flexible element 14 rather than by the PZT element 13. The presence of the flexible element 14 thus protects the PZT element 13 from damage, cracking, malfunction, and stresses that are often induced by the application of external forces to a PZT element. For instance, referring to FIG. 4A, an external impact torques the driven element 12, thus tilting it relative to the slide guide 18, and bending the flexible element 14, thereby protecting the PZT element 13 from experiencing a torque. Similarly, referring to FIG. 4B, a downward force applied to the driven element 12 (e.g., by the weight of a specimen) also causes the flexible element 14 to bend, and thus avoids application of a torque to the PZT element 13.

The flexible element 14 may be formed of, for instance, steel, aluminum, carbon fiber, plastic, wood, or another suitable material. The friction element 16 is formed of, for instance, ceramic, copper or copper alloy, sapphire, or another material suitable to establish a frictional contact with the driven element 12. In some cases, the friction element 16 may be formed of a magnet, a magnetic material, or a conductive material, including a magnetic conductive material.

Referring again to FIGS. 2 and 3, a preload element 151 is disposed between the flexible element 14 and the housing 11. The preload element 151 is, for instance, a spiral spring or a spring plate formed of metal, carbon fiber, or plastic. The preload element 151 applies a mechanical force between the friction element 16 and the surface 121 of the driven element 12, augmenting the frictional force between the friction element 16 and the surface 121.

Figure 5A:
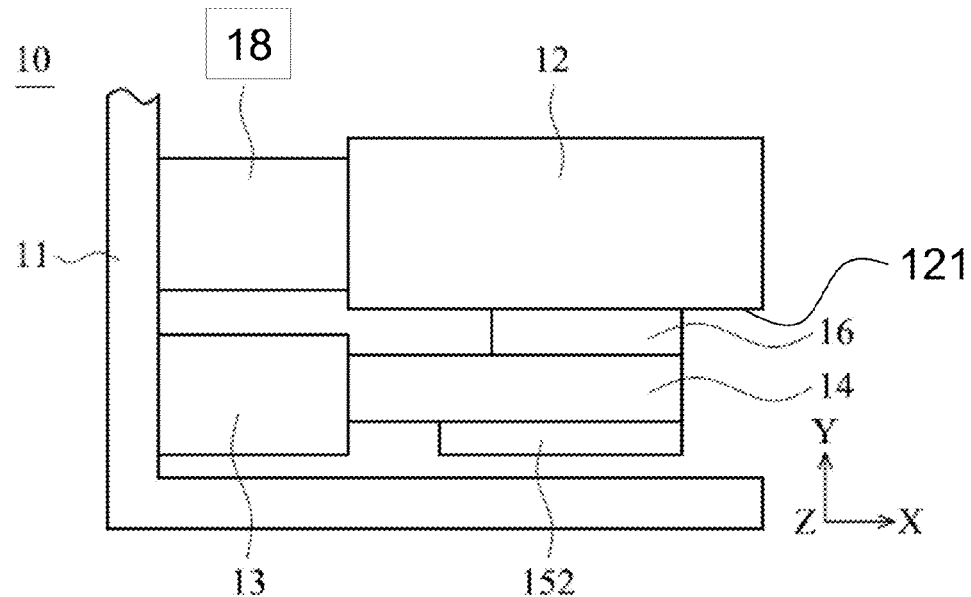
FIGS. 5A and 5B are block diagrams of a friction-driven actuator employing a magnet.

Referring to FIG. 5A, as an alternative to a mechanical preload force, a magnetic force can be applied between the friction element 16 and the driven element 12 by a magnetic preload element 152. In this case, the driven element 12 is formed of a magnetic material or a magnetic conductive material and the magnetic preload element 152 is a magnet. The attractive magnetic force between the driven element 12 and the magnet 152 augments the frictional force between the friction element 16 and the surface 121.

Figure 5B:
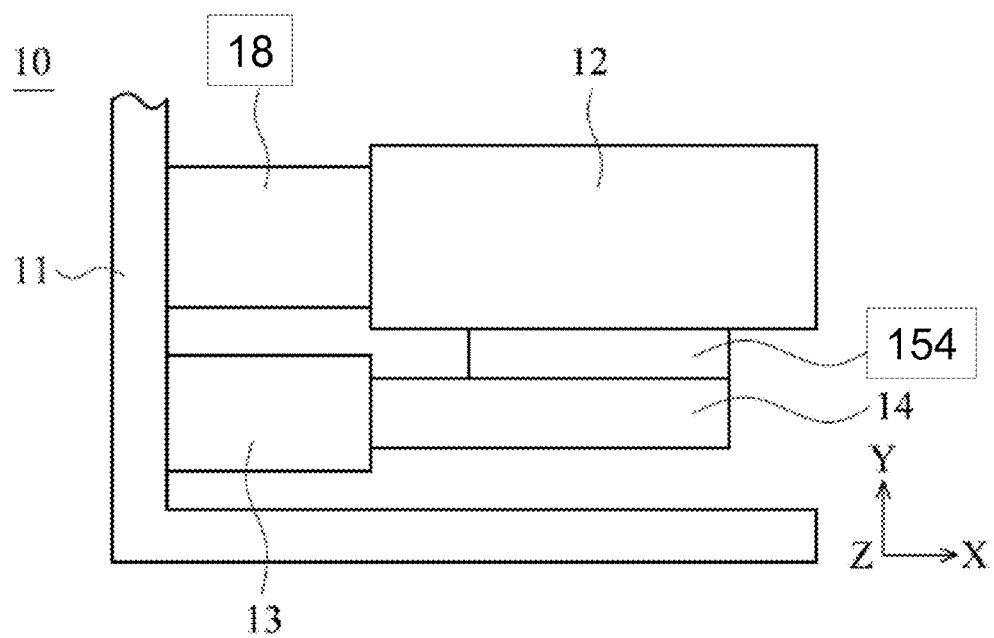

In an alternative embodiment illustrated in FIG. 5B, a magnetic force causes the friction force. In this embodiment, the driven element 12 is formed of a magnetic material, and a magnet 154 is disposed between the flexible element 14 and the driven element 12. Motion is transferred from PZT 13 to the driven element 12 via a combination of a frictional coupling between the magnet 154 and the driven element 12 and a magnetic coupling between the magnet 154 and the driven element 12.

Figure 6:
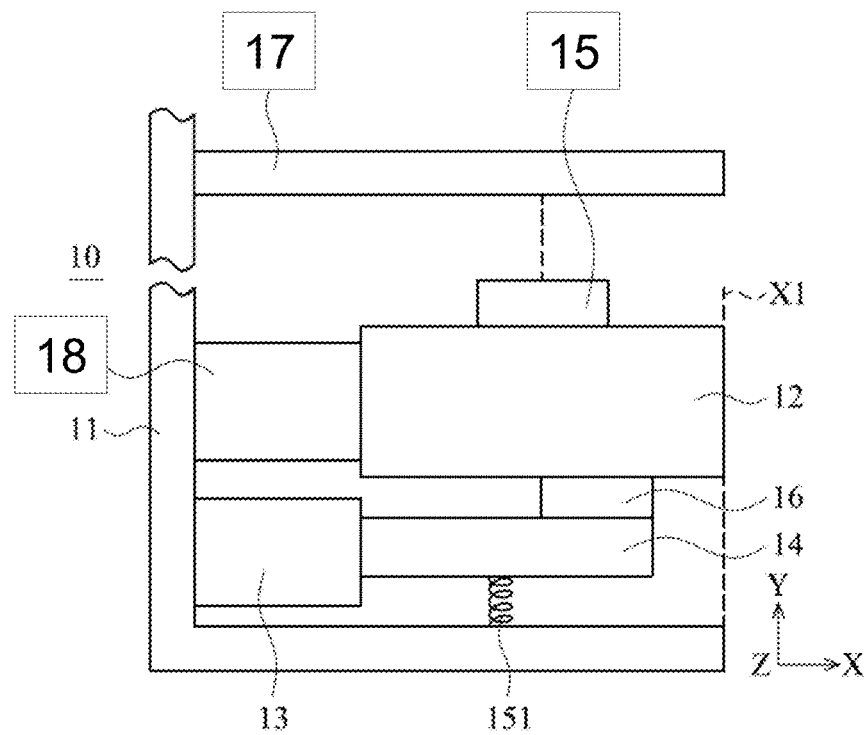
FIG. 6 is a block diagram of a friction-driven actuator with a position sensor.

Referring to FIG. 6, a position sensor 15 is coupled to the driven element 12. An encoder 17, which may employ optical, magnetic, resistive, or other encoding mechanisms, is coupled to the housing 11. The position sensor 15 communicates with the encoder 17 to allow long-range closed-loop positioning control of the friction-driven actuator 10.

Control of the Piezoelectric Element

The PZT element used in the friction-driven actuator may include a piezoelectric stack element, a shear mode piezoelectric element, or another type of piezoelectric element. The PZT element may be driven by any of a number of electrical signal formats, such as a triangular signal, a saw-tooth signal, or a pulse width modulation signal. The frequency, amplitude, and shape of the electrical signal applied to the PZT element affect the transfer of motion from the PZT element to the driven element. Appropriate selection of the frequency, amplitude, and shape of the electrical signal can enable rapid long-range (centimeter or millimeter scale) positioning and scanning as well as slower, precision (nanometer or sub-nanometer scale) positioning and scanning.

Figure 7:
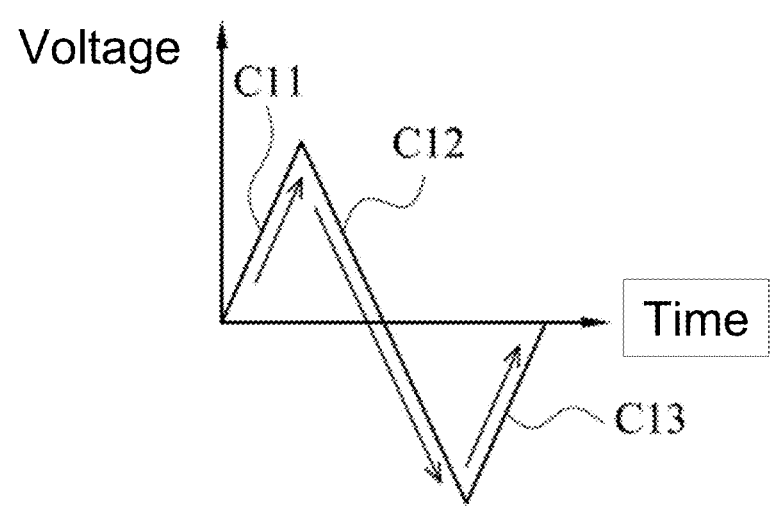
FIG. 7 is a triangular waveform.
Figure 8:
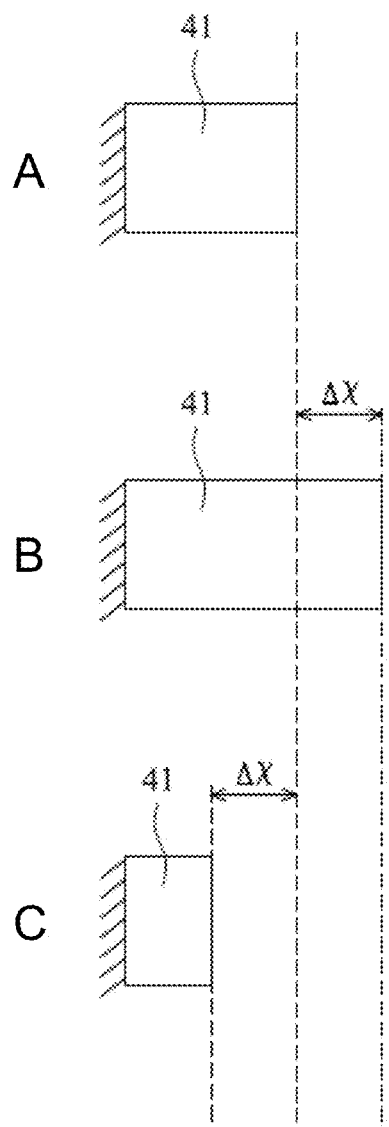
FIG. 8 is a diagram illustrating elongation and contraction of a piezoelectric stack element.

Referring to FIGS. 7 and 8, a PZT stack 41 is actuated via the application of the triangular electrical signal shown in FIG. 7 for sub-nanometer scale high resolution positioning and scanning in one direction. Prior to application of a signal, the PZT stack 41 is not deformed, as shown in FIG. 8A. Upon application of a first signal C11, the PZT stack 41 elongates by a distance ΔX along the X axis to a position +ΔX, as shown in FIG. 8B. Upon application of a second signal C12, the PZT stack 41 contracts along the X axis to a position −ΔX, as shown in FIG. 8C. In response to a third signal C13, the PZT stack 41 elongates to its original configuration, as shown again in FIG. 8A.

Figure 9:
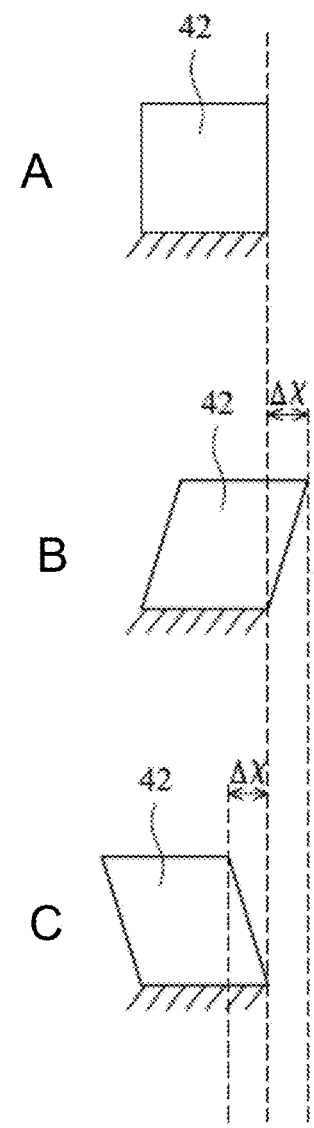
FIG. 9 is a diagram illustrating shear deformation of a shear mode piezoelectric element.

Referring to FIGS. 7 and 9, a shear mode PZT element 42 is actuated via the application of the same triangular electrical signal. Prior to application of a signal, the PZT element 42 is not deformed (position A). Upon application of the first signal C11, the PZT element 42 deforms and a top surface of the PZT element 42 shifts along the X axis to a position +ΔX (position B). Upon application of the second signal C12, the PZT element 42 deforms in the opposite direction and the top surface of the PZT element 42 shifts along the X axis to a position −ΔX (position C). In response to the third signal C13, the PZT element 42 returns to its original configuration (position A).

Figure 10:
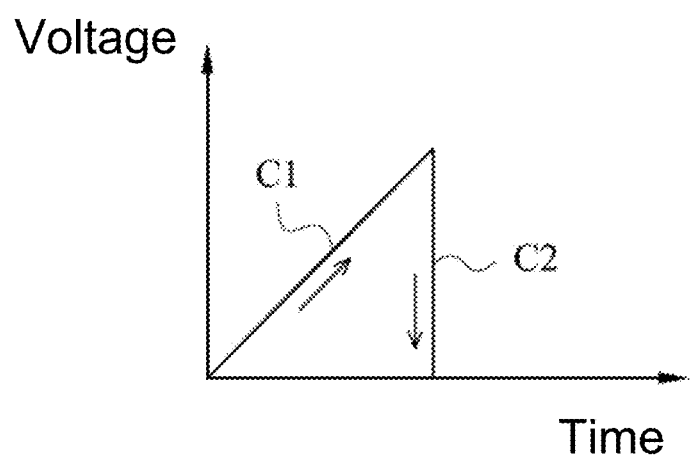
FIG. 10 is a continuous saw-tooth waveform.
Figure 11A:
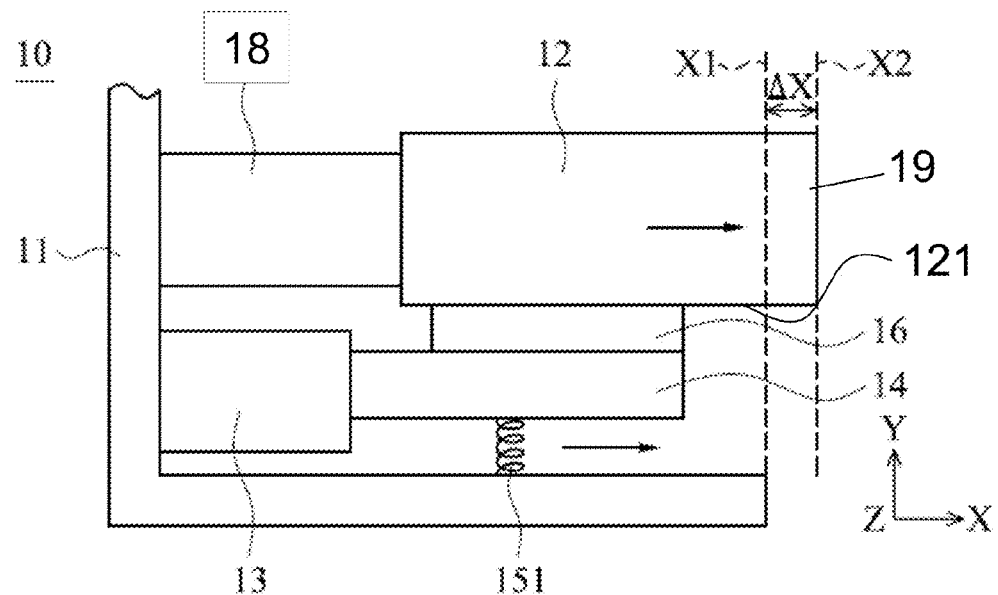
FIGS. 11A and 11B are block diagrams of the friction-driven actuator of FIG. 2 under the application of the saw-tooth waveform of FIG. 10.

Referring to FIGS. 10 and 11A, the PZT element 13 is actuated via the continuous saw-tooth waveform to drive the driven element via "stick-slip" motion (also known as "inertial drive") for long-range motion. Prior to the application of an electrical signal, the PZT element 13 is not deformed, and a distal end 19 of the driven element 12 is at its initial position X1 (shown in FIG. 3). When a voltage signal C1 is applied to the PZT element 13, the PZT element 13 elongates in the X direction, causing the flexible element 14 and the friction element 16 to move in the X direction. This motion is transferred to the driven element 12 via the frictional coupling between the friction element 16 and the driven element 12, causing a distal end 19 of the driven element 12 to move a distance ΔX to position X2.

Figure 11B:
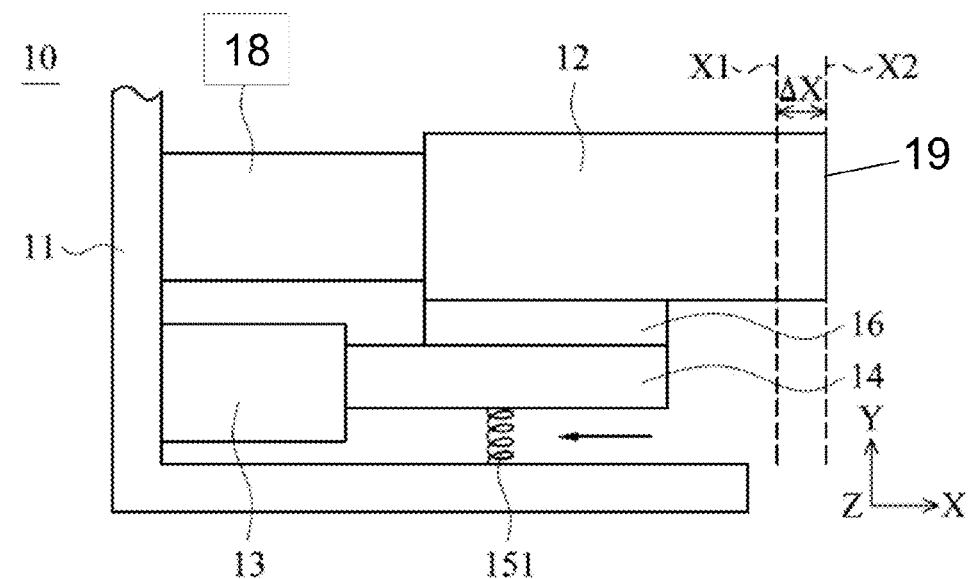

Referring now to FIGS. 10 and 11B, a second voltage signal C2 is then applied to the PZT element 13, causing the PZT element 13 to contract to its original configuration. This contraction causes the flexible element 14 and the friction element 16 to move back along the X axis to their respective original positions. However, if the dynamic acceleration of the flexible element 14 and the friction element 16 caused by the sudden contraction of the PZT element 13 is sufficiently large, relative motion may occur between the friction element 16 and the driven element 12. For example, the friction element 16 may slide relative to the driven element 12, causing the driven element 12 to stay in position X2 (as shown) or to move back along the X axis by a distance less than ΔX.

When applying a continuous saw-tooth or inverted saw-tooth waveform to the PZT element 13, the driven element 12 may be moved by this stick-slip mechanism in the range of a millimeter in the X direction relative to housing 11. The frequency and/or amplitude of the saw-tooth waveform can be adjusted to achieve a desired response from the PZT element.

Figure 12A:
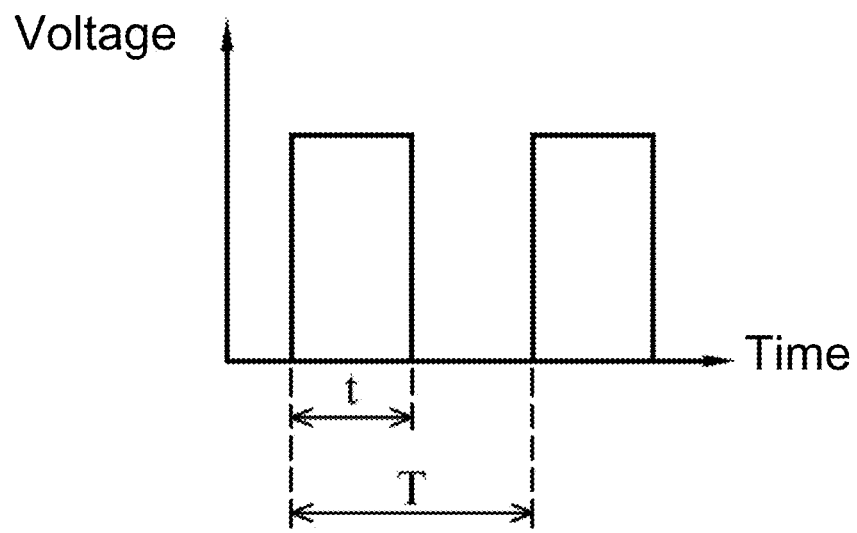
FIGS. 12A-12C are pulse width modulation waveforms.
Figure 12B:
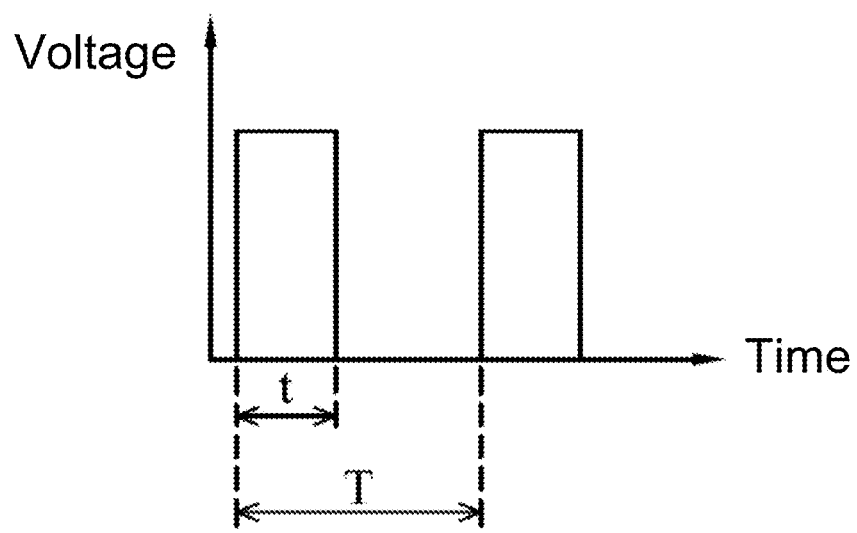
Figure 12C:
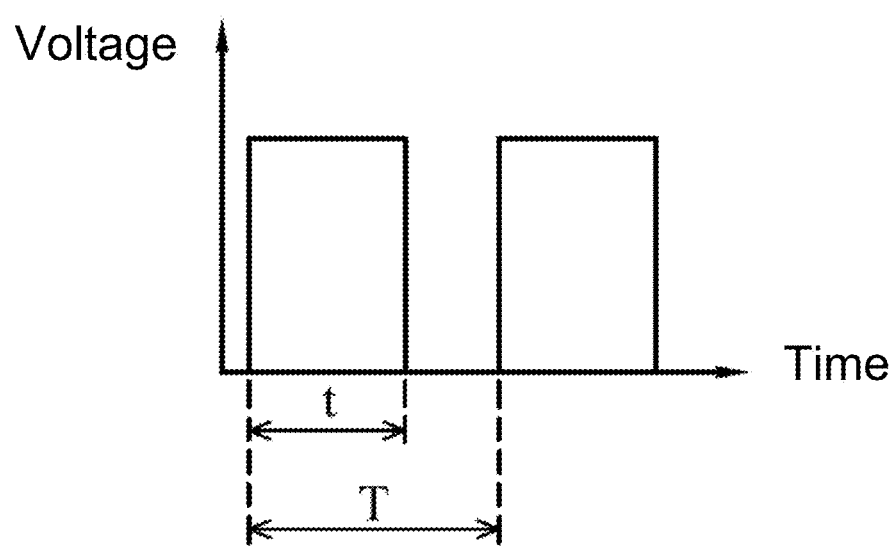

Referring to FIGS. 2 and 12A-12C, the PZT element 13 may also be controlled by an electrical pulse width modulated (PWM) signal for high-speed, centimeter-scale long range movement via a stick-slip mechanism. No movement of the driven element 12 occurs when a selective frequency square wave with 50% duty cycle (i.e., t/T=0.5; FIG. 12A) is applied to the PZT element 13. When a square wave with less than 50% duty cycle (t/T<0.5; FIG. 12B) is applied to the PZT element 13, the driven element 12 moves in the +X direction. When a square wave with greater than 50% duty cycle (t/T>0.5; FIG. 12C) is applied to the PZT element 13, the driven element 12 moves in the −X direction. In general, stick-slip motion driven by a PWM signal is faster but less precise than motion driven by a triangular or saw-tooth electrical signal.

Alternative Configurations

Figure 13A:
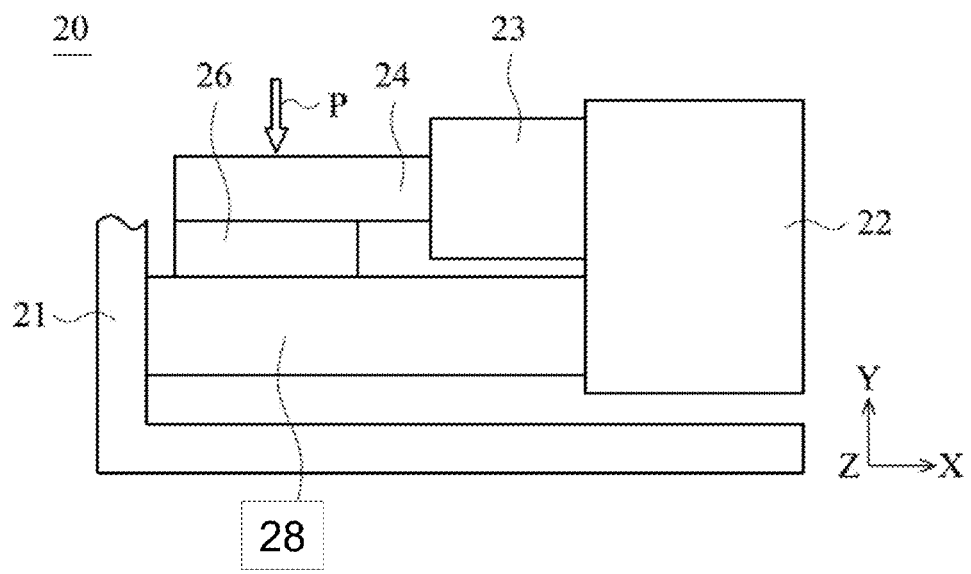
FIGS. 13A and 13B are block diagrams of an alternative embodiment of a friction-driven actuator.

Referring to FIG. 13A, in an alternative configuration, a friction-driven actuator 20 includes a housing 21, and a PZT element 23 connected at a first end to a driven element 22 and at a second end to a flexible element 24. A friction element 26 is anchored to flexible element 24 and slidably frictionally engages a top surface of a slide guide 28. The elongation and contraction of the PZT element 23 causes driven element 22 to move in the ±X direction along slide guide 28 by a stick-slip mechanism. In this embodiment, the distance that driven element 22 can be moved is limited by the length of slide guide 28 rather than by the length of driven element 22. This embodiment is well suited to millimeter- or centimeter-scale long range motion.

Figure 13B:
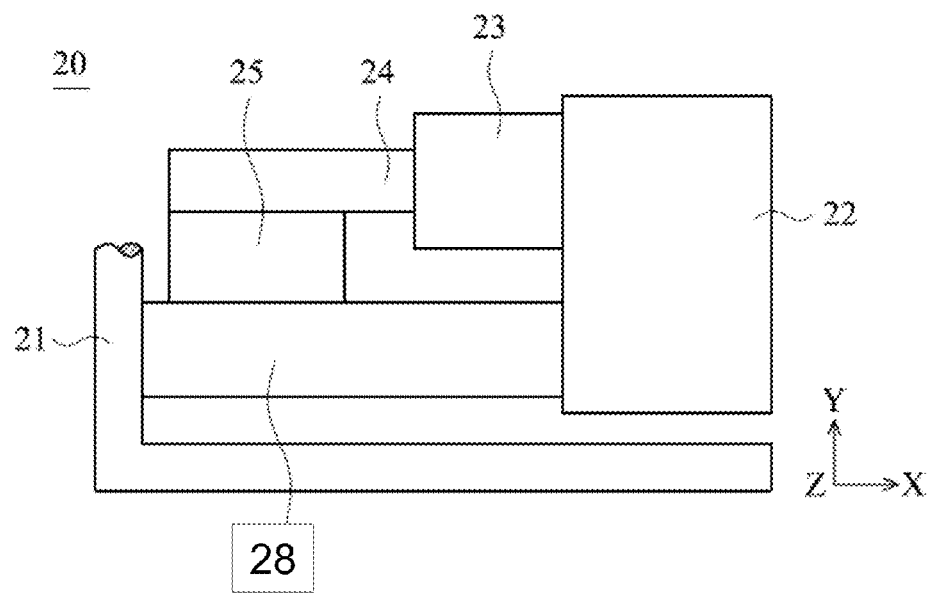

In an alternative embodiment shown in FIG. 13B, slide guide 28 is formed of a magnetic material, and a magnet 25 is disposed between flexible element 24 and slide guide 28. Magnet 25 and slide guide 28 are engaged via both a frictional coupling and an attractive magnetic force.

Figure 14A:
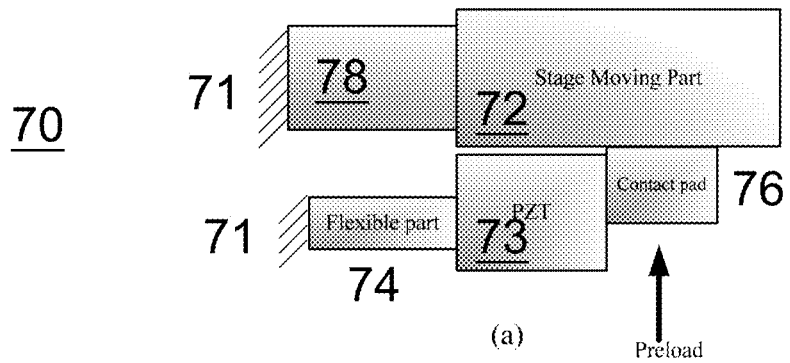
FIGS. 14A-14C are block diagrams of an alternative embodiment of a friction-driven actuator.
Figure 14B:
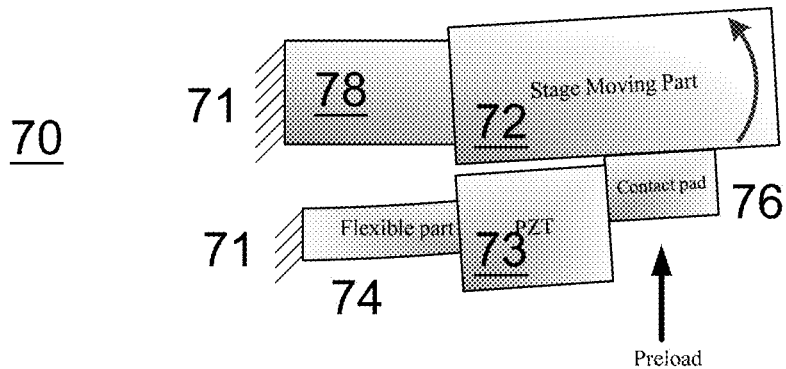
Figure 14C:
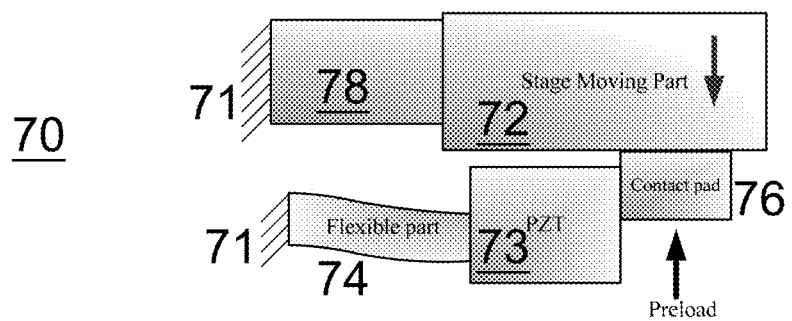

Referring to FIGS. 14A-14C, in another alternative configuration, a friction-driven actuator 70 includes a flexible element 74 connected at a first end to a housing 71 and at a second end to a PZT element 73. A driven element 72 is mounted on a slide guide 78, which is connected to the housing 71. As the PZT element elongates and contracts, this linear motion is transferred to the driven element 72 via a friction element 76, which is slidably frictionally coupled to the driven element 72. In some cases, a mechanical or magnetic preload force may be applied. In this configuration, the flexible element 74 protects the PZT element 73 from potentially damaging loads, stresses, and strains, such as a torque from the weight of a specimen, as shown in FIG. 14C.

Figure 15A:
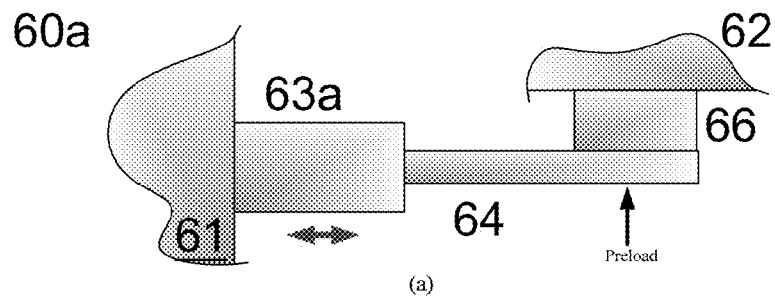
FIGS. 15A-15D are block diagrams of alternative embodiments of a friction-driven actuator.
Figure 15B:
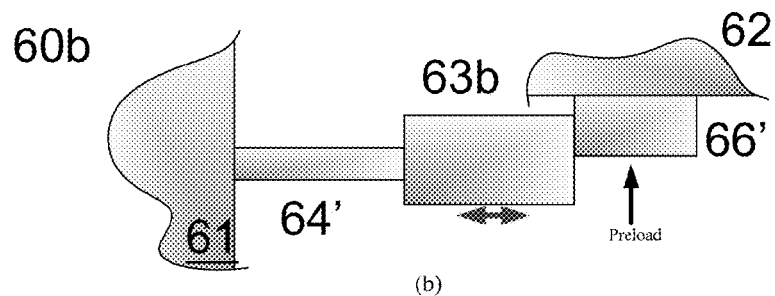
Figure 15C:
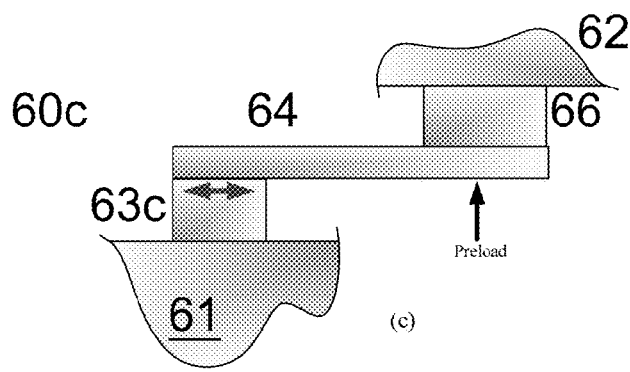

Referring to FIGS. 15A-15D, in some embodiments, a slide guide is not present. Referring specifically to FIGS. 15A and 15C, in friction-driven actuators 60a and 60c, a PZT stack 63a and a shear PZT element 63c, respectively, are anchored to a housing 61. Motion of the PZT stack 63a and the PZT element 63c is transferred to a driven element 62 via a flexible element 64 and a friction element 66. A mechanical or magnetic preload force may also be applied.

Figure 15D:
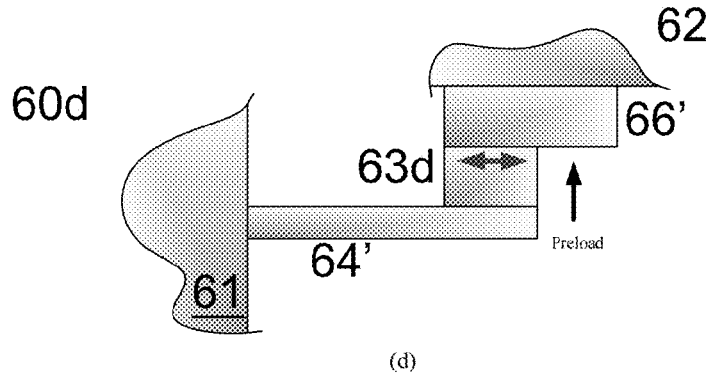

Referring now to FIGS. 15B and 15D, in friction-driven actuators 60b and 60d, a flexible element 64' is anchored to housing 61. A PZT stack 63b and a shear PZT element 63d, respectively, are connected to the flexible element 64'. Motion of the PZT stack 63b and the shear PZT element 63d is transferred to a driven element 62 via a friction element 66'. A mechanical or magnetic preload force may also be applied.

Figure 16A:
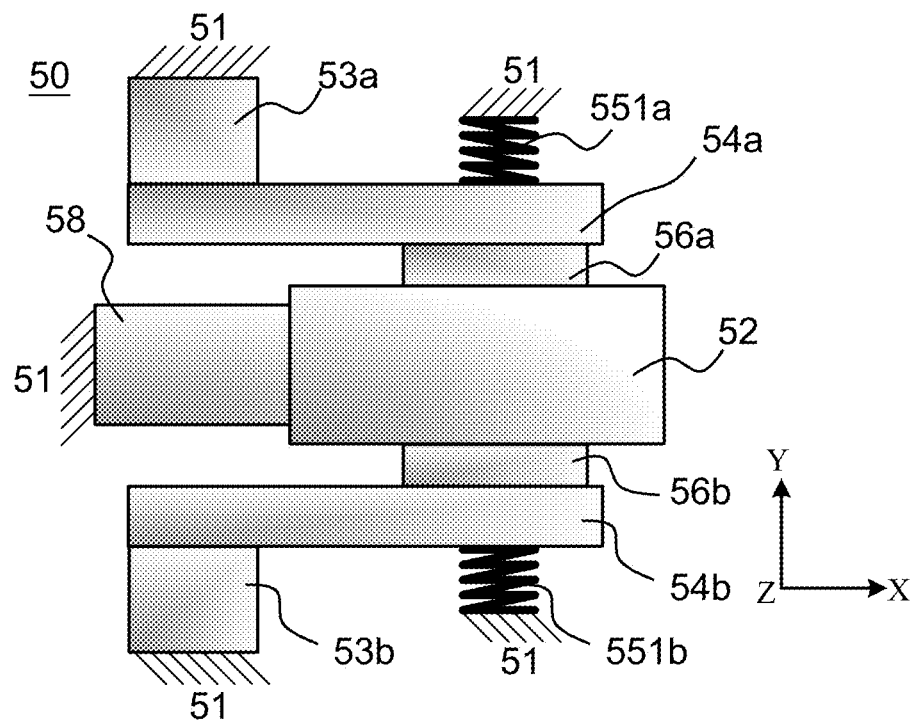
FIGS. 16A and 16B are block diagrams of an alternative embodiment of a friction-driven actuator.

Referring to FIG. 16A, in another alternative embodiment, a friction-driven actuator 50 includes two shear mode PZT elements 53a, 53b anchored at one end to a housing 51. Application of an electrical signal to the PZT elements 53a, 53b induces shear deformation in the PZT elements 53a, 53b. Second ends of the PZT elements 53a, 53b are connected to flexible elements Ma, 54b, which frictionally engage a driven element 52 via two friction elements 56a, 56b. In some instances, the flexible elements 54a, 54b directly frictionally engage the driven element 52. Preload elements 551a, 551b, such as springs, apply forces between the friction elements 56a, 56b and the driven element 52, increasing the strength of the coupling between the friction elements 56a, 56b and the driven element 52. The shear deformations of the PZT elements 53a, 53b are transferred to the flexible elements 54a, 54b and the friction elements 56a, 56b as linear motion along the X axis, which in turn causes the driven element 52 to move in the X direction along a slide guide 58.

Figure 16B:
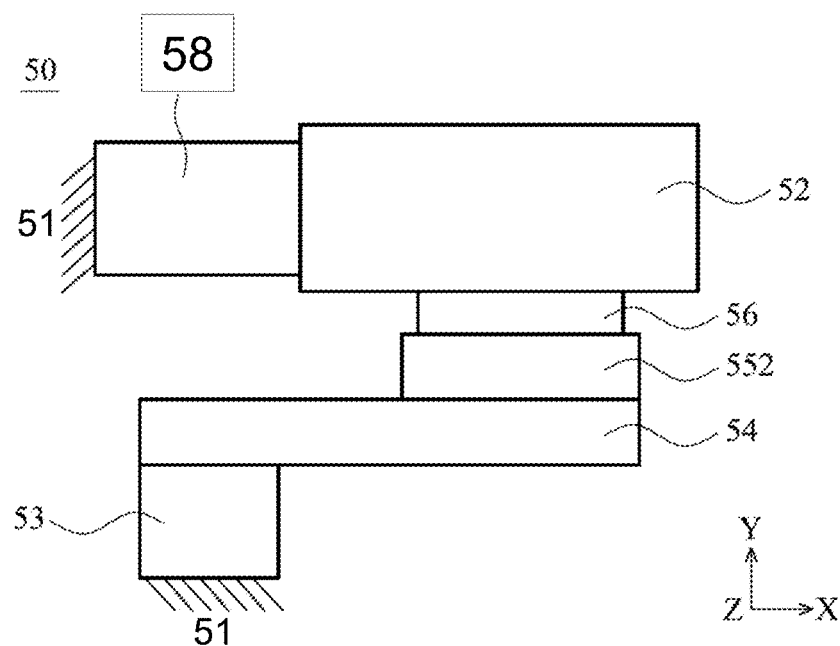

Referring to FIG. 16B, in another example, a magnet 552 is added to a friction-driven actuator 50 between a flexible element 54 and a friction element 56. The driven element 52 is formed of a magnetic material. The attractive magnetic force between a magnet 552 and the driven element 52 enhances the frictional coupling between the friction element 56 and the driven element 52.

Figure 17A:
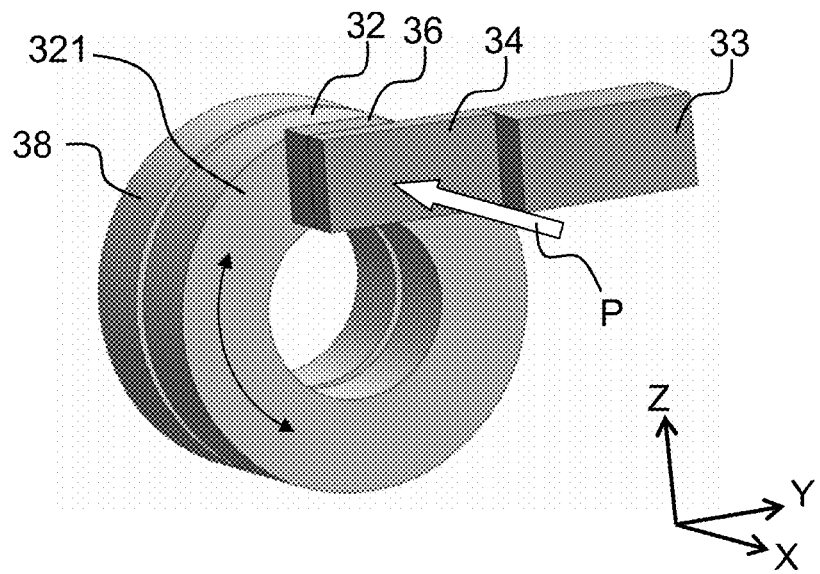
FIGS. 17A-17D are block diagrams of a friction-driven actuator that generates rotary motion in a driven element.

Referring to FIG. 17A, in another embodiment, a friction-driven actuator 30 induces rotary motion in a ring-shaped driven element 32 related to the ring shape rotary guide 38. A PZT element 33 is connected at one end to a housing 31 (not shown). A second end of the PZT element 33 is connected to a flexible element 34. The flexible element 34 is frictionally coupled to a side face 321 of the driven element 32 via a friction element 36. A preload force P, generated by a spring, a magnet, or another mechanism, enhances the coupling between the friction element 36 and the driven element 32. Application of an electrical signal to the PZT element 33 induces an elongation or contraction of the PZT element 33, which in turn causes the flexible element 34 and the friction element 36 to move in the X direction. Through the frictional coupling between the friction element 36 and a side face 321 of the driven element 32, the X direction motion of the friction element 36 induces rotation of the driven element 32 about its center.

Figure 17B:
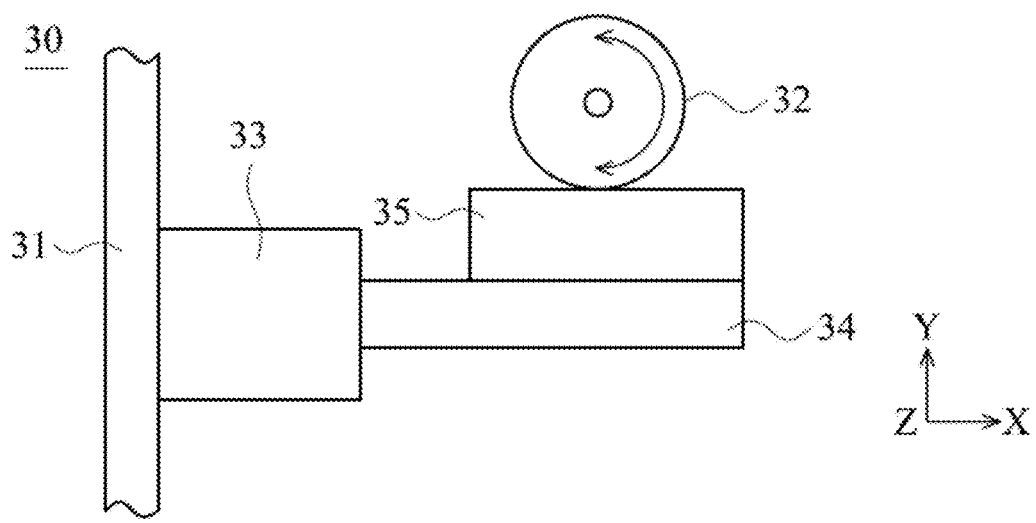

Referring to FIG. 17B, in some cases, the driven element 32 is formed of a magnetic material, and a magnet 35 is employed in place of the friction element 36. The attractive magnetic force between the driven element 32 and the magnet 35 enhances the frictional force between the driven element 32 and the magnet 35.

Figure 17C:
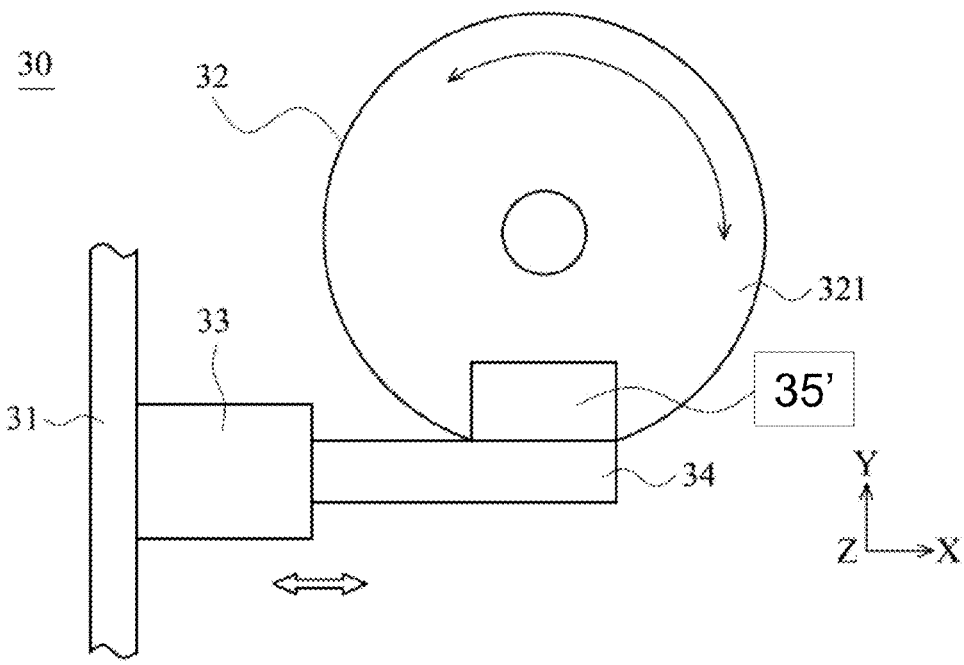

Referring to FIG. 17C, in other instances, the driven element 32 is formed of a magnetic material, and a magnet 35' is coupled to a side surface 321 of the driven element 32. Elongation or contraction of the PZT element 33 causes a flexible element 34 and the magnet 35' to move in the X direction, inducing rotation of the driven element 32 about its center.

Figure 17D:
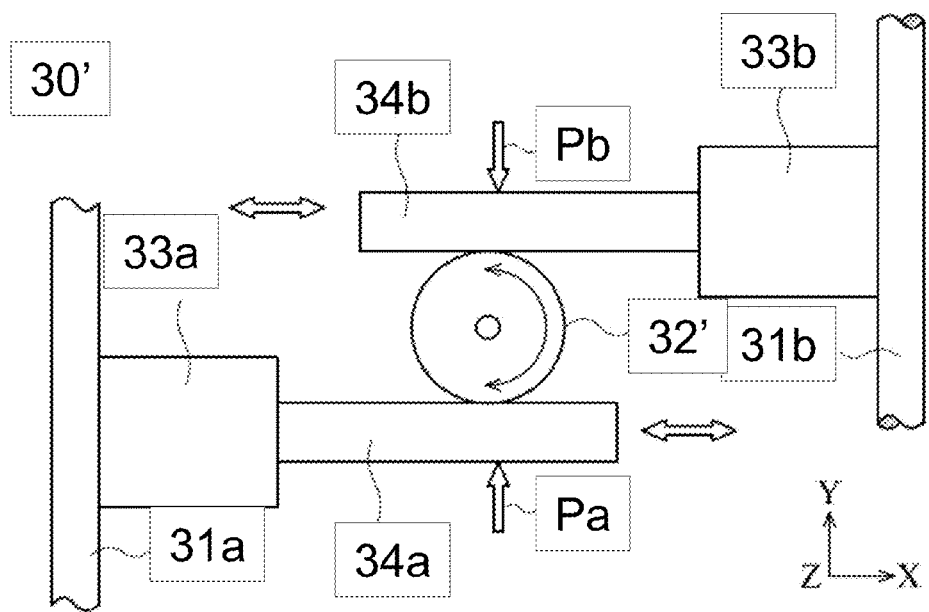

Referring to FIG. 17D, a friction-driven actuator 30' induces rotary motion in a driven element 32'. A first portion of the friction-driven actuator 30' includes a piezoelectric element 33a connected at one end to a housing 31a. A second end of the piezoelectric element 33a is connected to a flexible element 34a. The flexible element 34a directly engages a bottom edge of the driven element 32'. A preload force Pa enhances the frictional force between the flexible element 34a and the driven the element 32'. A second portion of the friction-driven actuator 30' includes a piezoelectric element 33b connected at one end to a housing 31b. A second end of piezoelectric element 33b is connected to a flexible element 34b. The flexible element 34b directly engages a top edge of the driven element 32'. A preload force Pb enhances the frictional force between the flexible element 34b and the driven element 32'. Rotation of the driven element 32' is controlled by both piezoelectric elements 33a and 33b. In some cases, a friction element (not shown) is disposed between the flexible element 34a and the driven element 32' and/or between the flexible element 34b and the driven element 32'.

Figure 18:
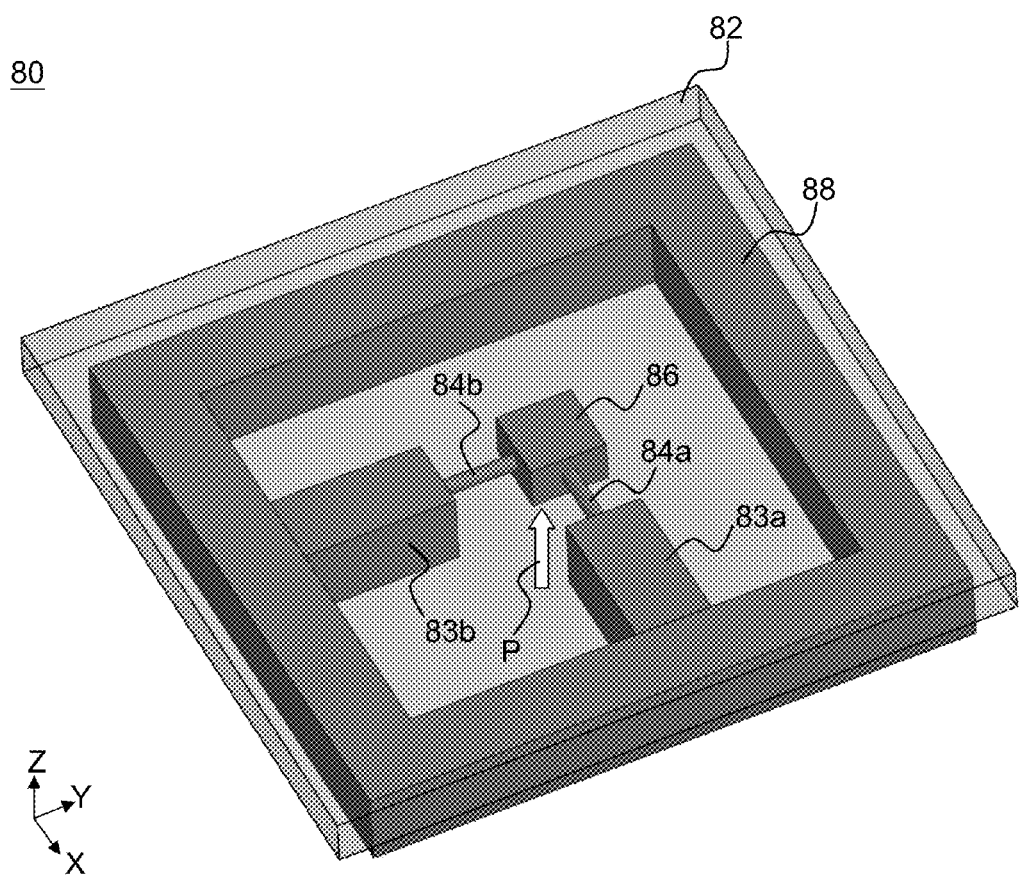
FIG. 18 is a block diagram of an alternative embodiment of a friction-driven actuator that generates X and Y motion in a driven element.

Referring to FIG. 18, a friction-driven actuator 80 induces X and Y linear motion in a driven element 82. The friction-driven actuator 80 includes a first piezoelectric element 83a connected at one end to an X, Y slide guide frame 88. The other end of the piezoelectric element 83a is connected to a flexible element 84a. The flexible element 84a is connected at the other end to a friction element 86. The second piezoelectric element 83b is connected at one end to the X, Y slide guide frame 88 and the other end of the piezoelectric element 83b is connected to a flexible element 84b. The flexible element 84b is connected at the other end to the friction element 86. The friction element 86 engages a bottom face of the driven element 82. A preload force P enhances the frictional force between the friction element 86 and the driven element 82. X axis movement of the driven element 82 is driven by the piezoelectric element 83a. Y axis movement of the driven element 82 is driven by the piezoelectric element 83b.

In general, a shear mode PZT can be used in place of a PZT stack in both the linear and rotational motion embodiments described above.

It is to be understood that the foregoing description is intended to illustrate and not to limit the scope of the invention, which is defined by the scope of the appended claims. Other embodiments are within the scope of the following claims.

We claim:

1. An apparatus for actuating a positioning device, said apparatus comprising a housing, a piezoelectric element connected to the housing, a driven element configured to move relative to the housing, and a motion transfer element connected to the piezoelectric element and configured to transfer, to the driven element, a motion caused by elongation of the piezoelectric element along a first direction, wherein said motion transfer element flexes in a second direction perpendicular to said first direction in response to a force perpendicular to said first direction, wherein said first direction is a direction along which said piezoelectric element is actuated, and wherein the driven element is configured to move relative to the housing via stick-slip motion.

2. The apparatus of claim 1, wherein the motion transfer element is configured to frictionally engage the driven element.

3. The apparatus of claim 1, further comprising a preload element configured to impose a force normal to an interface between the motion transfer element and the driven element.

4. The apparatus of claim 3, wherein the preload element comprises a spring.

5. The apparatus of claim 3, wherein the preload element comprises a magnet.

6. The apparatus of claim 1, further comprising a friction element disposed between the motion transfer element and the driven element, the friction element being configured to frictionally engage the driven element.

7. The apparatus of claim 6, wherein the friction element includes a magnet.

8. The apparatus of claim 6, further comprising a preload element configured to impose a force normal to an interface between the friction element and the driven element.

9. The apparatus of claim 1, further comprising a slide guide configured to guide the motion of the driven element relative to the housing along a direction in which the driven element is driven.

10. The apparatus of claim 9, wherein the slide guide is further configured to limit the extent of motion of the driven element along a direction in which said driven element is driven.

11. The apparatus of claim 1, wherein the driven element is separated from the piezoelectric element.

12. The apparatus of claim 1, wherein the driven element is configured to move linearly relative to the housing.

13. The apparatus of claim 1, wherein the driven element is configured to rotate relative to the housing.

14. The apparatus of claim 1, wherein said motion transfer element is supported at a first end adjacent to said piezoelectric element and is free to move at a second end opposite said first end.

15. The apparatus of claim 1, further comprising: a position-sensing element coupled to the driven element.

16. The apparatus of claim 1, wherein the piezoelectric element is controllable by a pulse-width modulated electrical signal.

17. The apparatus of claim 1, wherein the piezoelectric element comprises a piezoelectric stack.

18. The apparatus of claim 1, wherein the piezoelectric element comprises a shear mode piezoelectric element.

19. The apparatus of claim 1, wherein the driven element is configured to receive a specimen.

20. The apparatus of claim 1, wherein said piezoelectric element extends along a first axis and said driven element extends along a second axis that is different from said first axis, wherein said first and second axes are parallel.

21. The apparatus of claim 1, wherein the piezoelectric element is controllable by a triangular wave electrical signal.

22. The apparatus of claim 21, wherein said slide guide is further configured to limit said extent of motion of said driven element along a direction in which said driven element is driven.

23. An apparatus for actuating a positioning device, said apparatus comprising: a housing; a piezoelectric element; a motion transfer element connected to the piezoelectric element; and a driven element configured to move relative to the housing by stick-slip motion in response to a motion of the piezoelectric element, wherein said motion transfer element flexes in response to a force perpendicular to a direction in which said piezoelectric element extends upon actuation thereof.

24. The apparatus of claim 23, further comprising a friction element disposed between the piezoelectric element and the driven element, the friction element being configured to transfer a motion of the piezoelectric element to the driven element.

25. The apparatus of claim 24, further comprising a preload element configured to impose a force normal to an interface between the friction element and the driven element.

26. The apparatus of claim 24, further comprising a friction element that includes a magnet.

27. The apparatus of claim 23, wherein the motion transfer element is connected to the housing.

28. The apparatus of claim 23, wherein the piezoelectric element is connected to the driven element.

29. An apparatus for actuating a positioning device, said apparatus comprising a housing, a piezoelectric element connected to the housing, a driven element configured to move relative to the housing, and a motion transfer element connected to the piezoelectric element and configured to transfer a motion of the piezoelectric element to the driven element, wherein the driven element is configured to move relative to the housing via stick-slip motion, wherein the piezoelectric element is configured to respond to application of a voltage with a first transition between a first length and a second length along a first axis and to respond to removal of the voltage with a second transition back to the first length from the second length along said first axis, wherein in response to the first transition, the driven element is displaced from a first position to a second position, wherein, in response to said second transition, said driven element either remains at the second position or is displaced to a third position between the first and second positions, and wherein said motion transfer element flexes in response to a force perpendicular to said first axis.

30. The apparatus of claim 29, further comprising a slide guide configured to guide said motion of said driven element relative to said housing along a direction in which said driven element is driven.

31. The apparatus of claim 29, wherein said driven element is separated from said piezoelectric element.

32. The apparatus of claim 29, wherein said piezoelectric element is controllable by an electrical signal selected from said group consisting of a triangular-wave electrical signal, a saw-tooth electrical signal, and a pulse-width modulated electrical signal.

33. The apparatus of claim 29, wherein said piezoelectric element comprises a shear mode piezoelectric element.

* * * * *